US010697902B2

(12) United States Patent
Sharma et al.

(10) Patent No.: US 10,697,902 B2
(45) Date of Patent: Jun. 30, 2020

(54) X-RAY TENSOR TOMOGRAPHY SYSTEM (71) Applicant: TECHNISCHE UNIVERSITÄT MÜNCHEN, Munich (DE)

(72) Inventors: Yash Sharma, Munich (DE); Tobias Lasser, Munich (DE); Franz Pfeiffer, Garching (DE)

(73) Assignee: TECHNISCHE UNIVERSITÄT MÜNCHEN, Munich (DE)

(*) Notice: Subject to any disclaimer, the term of this patent is extended or adjusted under 35 U.S.C. 154(b) by 30 days.

(21) Appl. No.: 16/309,244

(22) PCT Filed: Jun. 13, 2017

(86) PCT No.: PCT/EP2017/064440
§ 371 (c)(1),
(2) Date: Dec. 12, 2018

(87) PCT Pub. No.: WO2017/216178
PCT Pub. Date: Dec. 21, 2017

(65) Prior Publication Data
US 2019/0310208 A1 Oct. 10, 2019

(30) Foreign Application Priority Data
Jun. 13, 2016 (EP) .................................. 16174203

(51) Int. Cl.
G01N 23/046 (2018.01)
G01N 23/20 (2018.01)
G01N 23/201 (2018.01)
(52) U.S. Cl.
CPC ......... G01N 23/046 (2013.01); G01N 23/201 (2013.01); G01N 23/20075 (2013.01); G01N 2223/419 (2013.01)

(58) Field of Classification Search
CPC .......................... G01N 23/046; G01N 23/201
See application file for complete search history.

(56) References Cited

U.S. PATENT DOCUMENTS

2011/0293064 A1* 12/2011 Huang ................. G01N 23/041
378/6
2016/0349193 A1 12/2016 Günter et al.

OTHER PUBLICATIONS

Malecki et al., "X-ray tensor tomography," 2014 EPL 105 38002; Retrieved from the internet [Mar. 8, 2020]; Retrieved from url <doi.10.1209/0295-5075/105/38002>. (Year: 2014).*

(Continued)

Primary Examiner — Yara B Green
(74) Attorney, Agent, or Firm — Sunstein LLP (57) ABSTRACT The present invention relates to an X-ray tensor tomography (XTT) system (34), comprising a source (12) for providing a beam with coherent X-rays, a first grating (16) with first grating lines and a second grating (18) with second grating lines, the second grating lines being parallel to the first grating lines and the XTT-system (34) being configured to relatively shift the first grating (16) and/or the second grating (18) in a shifting direction (32) being parallel to the planes of the gratings (16, 18), a stage (36) for rotating the specimen about a first axis of rotation and about not more than two axes of rotation (26), the first axis of rotation lying in a plane (38) being tilted by an angle ψ with respect to the to the planes of the gratings (16, 18), wherein 0°<ψ≤90°, and by an angle β with respect to a plane being orthogonal to the direction of the beam path at a location of the stage (36), wherein 0°<β<90°, a detector (22), a reconstruction unit configured to reconstruct scattering tensors for a specimen.

18 Claims, 7 Drawing Sheets (56) References Cited

OTHER PUBLICATIONS

Malecki et al., "X-ray tensor tomography." *EPL (Europhysics Letters)*105, No. 3 (2014): 38002.
Saeed et al., "Component-based TV regularization for X-ray tensor tomography." In Biomedical Imaging (ISBI), 2016 IEEE 13th International Symposium on, pp. 581-584. IEEE, 2016.
International Searching Authority—EPO, International Search Report, PCT/EP2017/064440; dated Jul. 20, 2017. 3 pages.

* cited by examiner

Acquisition Scheme C: 3 Axes of Rotation, 10h MeasurementTime:

Fig. 5a

Acquisition Scheme D: 2 Axes of Rotation, 10h MeasurementTime:

Fig. 5b

Acquisition Scheme E: 2 Axes of Rotation, 10h MeasurementTime:

3 Axes of Rotation, 8h Measurement Time:

Fig. 7b

2 Axes of Rotation, 8h Measurement Time:

Fig. 7c

1 Axis of Rotation, 53min Measurement Time:

Fig. 7d

X-RAY TENSOR TOMOGRAPHY SYSTEM

CROSS-REFERENCE TO RELATED APPLICATIONS

This Application is a U.S. national stage entry under 35 USC § 371 of Patent Cooperation Treaty Application PCT/EP2017/064440, filed Jun. 13, 2017, which claims priority from European Patent Application 16174203.6, filed Jun. 13, 2016, both of which are incorporated herein by reference in their entireties.

TECHNICAL FIELD

The present invention relates to X-ray tensor tomography.

BACKGROUND

X-ray tensor tomography (XTT) is an imaging modality for reconstructing three-dimensional (3D) scattering tensors from a sequence of two-dimensional (2D) dark-field projections obtained in a grating interferometer. Due to the use of anisotropic dark-field signal XTT allows to provide information about the orientations of micro-scale structures which cannot be resolved in traditional X-ray imaging techniques, such as absorption contrast X-ray tomography and differential phase contrast (DPC) X-ray tomography.

XTT allows for non-destructive testing and can be used, for example, to resolve the orientations of fibers in dense carbon fiber composites. These materials are critical to the safety, weight and performance of automobiles and airplanes. Another exemplary application of XTT is to resolve the structure in polymer materials manufactured using injection molding. In addition, XTT can be used to resolve the structures of dentinal tubules in human tooth which are not directly visible in traditional X-ray imaging and to resolve the orientations of the structures within bones which allows to study the strength mechanisms of bones.

Figure 1:
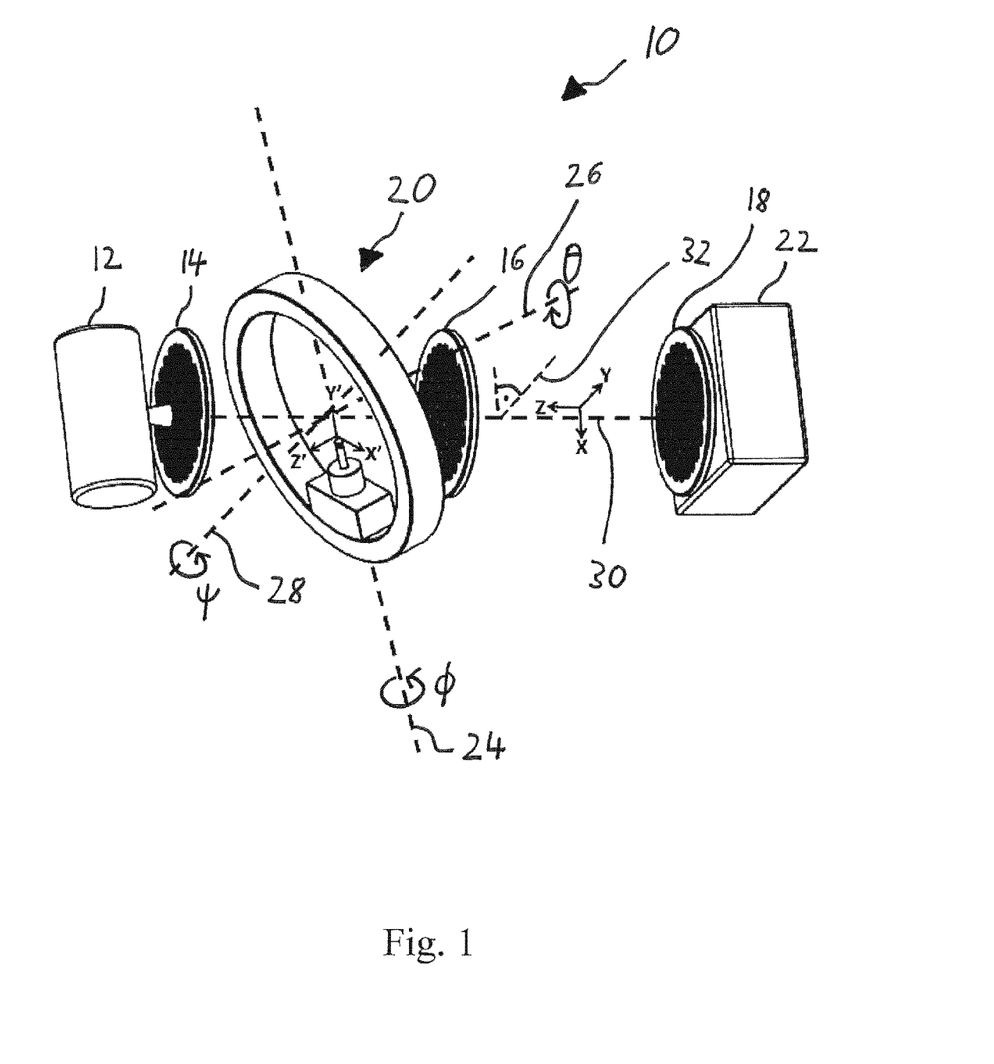
FIG. 1 shows a state-of-the-art XTT-system.

An Example of a state of the art XTT-system 10 including an X-ray grating interferometer in a so called Talbot-Lau configuration is shown in FIG. 1 and provided in the Article "X-ray tensor tomography", A. Malecki et at, EPL (Europhysics Letters), vol. 105, no. 3, p. 38002, 2011. The XTT-system 10 comprises an X-ray source 12, a source grating 14, a first grating 16, a second grating 18, a specimen stage 20 and a detector 22.

Such a system 10 can provide three types of projection images of the specimen: absorption contrast, differential phase contrast and dark-field contrast. All three contrast modes provide complimentary information about the inside structure of the specimen. The absorption contrast can provide information about the 3D distribution of the absorption coefficient, which may be related to the imaginary part of the refractive index, for example, and the DPC can provide information about the 3D distribution of the real part of the refractive index within a specimen. Both in X-ray absorption contrast computer tomography (CT) and in DPC CT scalar quantities, which are respectively related to the absorption coefficient and to the refractive index, are reconstructed by using reconstruction algorithms for a plurality of volume elements or voxels of the specimen.

For the case of XTT a plurality of tensor quantities are reconstructed for a plurality of associated voxels, wherein each tensor quantity corresponds to a scattering tensor providing information about the directional distribution of the scattering power at the respective voxel. The scattering tensors are reconstructed from a sequence of 2D X-ray dark-field projections. The contrast in the dark-field projection images is caused by ultra-small angle scattering of X-rays by small structures, which can have a size in the sub-micron and micron range, and thus encode information about the 3D position and the 3D orientation of the structures within the specimen. The reconstruction of full 3D scattering tensors for a specimen is known in the art and describes, for example, in the article "Constrained X-ray tensor tomography reconstruction", J. Vogel et al., Opt. Express, vol. 23, no 12, pp. 15134-15151, 2015.

For the purpose of XTT reconstruction several dark-field projections are acquired for different orientations of the specimen with respect to the XTT-system 10, wherein for each orientation the first and second gratings 16, 18 are shifted with respect to each other into different shifting positions, for each of which a projection is acquired with the detector 20. The projections corresponding to the different shifting positions of the gratings are combined to calculate absorption, differential phase contrast and dark-field signal for each sample orientation. The orientation of the specimen (not shown) is controlled by using the specimen stage 20. In the XTT-system 10 the specimen stage 20 corresponds to a three-circle Eulerian Cradle which allows rotating the specimen about a first axis of rotation 24 into different angle positions $\phi$, about a second axis of rotation 26 into different angle positions $\theta$ and about a third axis of rotation 28 into different angle positions $\psi$.

For the acquisitions the sample is positioned at a center of the Eulerian Cradle on an optical axis 30 of the MT-system 10, wherein the center is intersected by all three axes 24, 26, 28.

As shown in FIG. 1, the direction of the first axis of rotation 24 coincides with the y'-direction of a coordinate system x',y',z' of the specimen. The x',y',z' coordinate system of the specimen is rotated together with the specimen with respect to a stationary coordinate system x,y,z of the XTT-system 10. The first axis of rotation 24 lies within a plane defined by the Eulerian Cradle 20 and is rotated in this plane during a rotation about the second axis of rotation 26. The direction of the second axis of rotation 26 is orthogonal to the plane defined by the Eulerian Cradle, such that the second axis of rotation 26 is always orthogonal to the first axis of rotation 24. For $\phi=0°$ or $180°$ the direction of the second axis of rotation 26 corresponds to the z'-direction.

The direction of the third axis of rotation 28 coincides with the y-direction, such that the third axis of rotation 28 is stationary with respect to the XTT-system 10 and always orthogonal to the second axis of rotation 26.

In case of $\psi=0°$, the second axis of rotation 26 coincides with the optical axis 30 of the XTT-system 10 (z-direction). In case of $\theta=0°$, the direction of the first axis of rotation 24 (y'-direction) coincides with the y-direction.

All gratings 14, 16, 18 are pairwise parallel and therefore orthogonal to the optical axis 30. Each of the gratings 14, 16, 18 has grating lines, wherein the grating lines of each of the gratings 14, 16, 18 extend in the same direction orthogonally to the optical axis 30. A sensitivity direction 32 of the XTT-system to, which corresponds to the direction in which a phase shift of the X-rays is measured, is parallel to the planes of the gratings 14, 16, 18 and orthogonal to the grating lines. In the XTT-system 10 of FIG. 1, the sensitivity direction 32 coincides with the y-direction.

The acquisition scheme M proposed in the above mentioned article by Malecki et al. is given by:

$M=\{(\psi,\theta,\phi); \psi \in [0°,45°,90°,135°],$ $\theta \in [0°,45°,90°,135°],$ $\phi \in [-36,67°,-36°,\ldots,36,67°]\}$ resulting in 1776 different acquisition poses or orientations of the specimen, wherein for each orientation the first grating 16 is scanned or shifted with respect to the second grating 18 in eight steps over one grating period in the sensitivity direction, such that 14208 projections are acquired in total.

This acquisition with the above described acquisition geometry of the XTT-system 10 of FIG. 1 allows illuminating the specimen in a variety of different orientations, such that for the volume of the specimen a set of 3D scattering tensors can be reconstructed, wherein each scattering tensor provides information about an orientation of a scattering structure within the specimen within 3D space at a corresponding position in 3D space.

However, the space requirements of the acquisition geometry of the XTT-system 10 of FIG. 1 are quite high and the acquisition time is quite long, which leads to challenges to the commercialization of XTT.

SUMMARY OF THE INVENTION

The problem to be solved by the present invention is to provide a more robust and reliable XTT-system being capable for reconstructing sets of full 3D scattering tensors with reduced acquisition time, reduced cost, reduced complexity and with lower space requirements. This problem is solved by claim 1. Preferred embodiments are defined in the dependent claims.

The present invention relates to an X-ray tensor tomography (XTT) system, comprising
  a source for providing a beam with coherent X-rays along a beam path,
  an interferometer arranged along the beam path downstream the source comprising a first grating with first grating lines and a second grating with second grating lines, wherein
    the second grating lines are parallel to the first grating lines,
    the system is configured to relatively shift the first grating and the second grating with respect to each other in a shifting direction into different grating positions, wherein the shifting direction is parallel to the planes of the gratings,
  a stage for mounting a specimen in the beam path downstream the source, wherein the stage is designed to rotate the specimen about at least one first axis of rotation and about not more than two axes of rotation for orienting the specimen in the beam path and with respect to the beam path, wherein the first axis of rotation lies in a plane which is tilted
    by an angle $\psi$ with respect to the planes of the gratings, wherein $0° < \psi \leq 90°$, and
    by an angle $\beta$ with respect to a plane being orthogonal to the direction of the beam path at a location of the stage, wherein $0° < \beta \leq 90°$,
  a detector arranged downstream the source and the interferometer for acquiring a sequence of two-dimensional intensity distributions of X-rays of the beam,
  a reconstruction unit configured to reconstruct scattering tensors for a specimen containing on or more structures capable of scattering X-rays, wherein the scattering tensors provide information about the three-dimensional position of the one or more structures and about an orientation of the one or more structures, based on
    a sequence of two-dimensional intensity distributions acquired for different orientations of the specimen and for different grating positions, and on
    the orientations and grating positions, for which the sequence of two-dimensional intensity distributions is acquired.

Different from XTT-systems which are known from prior art, such as the XTT-system shown in FIG. 1 which uses three axes of rotation for orienting the specimen for image acquisition, the XTT-system of the present invention uses not more than two axes of rotation.

The inventors made the surprising discovery that it is possible to reconstruct full 3D scattering tensors by using only a single first axis of rotation for orienting the specimen, instead of three axes of rotation, if the first axis of rotation lies in a plane which is tilted by an angle $\psi$, $0° < \psi \leq 90$, with respect to the planes of the gratings and by an angle $\beta$, $0° < \beta < 90°$, with respect to a plane being orthogonal to the direction of the beam path. Reconstruction of "full 3D scattering tensors" means that any scattering direction and any structure orientation within the specimen can be reconstructed, such that the reconstruction is not limited to certain directions only, e.g. only to such directions which lie in a common plane. In other words, the directions provided by the reconstructed scattering tensors and indicating a local orientation of a structure may span a 3D space and not just a plane or a line. A full 3D reconstruction of scattering tensors allows detecting structures having any orientation.

The XTT-system of the present invention is based on this discovery and uses only one or two axes of rotation. This significantly reduces the complexity of the system and makes the system more robust and reliable. Further, no additional free space is required for moving components in order to rotate the specimen about an additional axis of rotation, such that components of the XTT-system around the specimen can be arranged closer together. Therefore, XTT-system of the present invention can be smaller, more compact, cheaper and less complex.

Preferably, the source is arranged for providing the beam along an optical axis of the XTT-system, wherein the second grating lines and the first grating lines are orthogonal to the optical axis. In this case, the angels $\psi$ and $\beta$ designate the same fixed angle, such that the first axis of rotation lies in a plane which is tilted by the fixed angle $\psi$ with respect to the planes of the gratings.

In one or more embodiments the shifting direction is orthogonal to the grating lines. In other embodiments the shifting direction is not orthogonal to the grating lines but comprises a component which is orthogonal to the grating lines.

In a preferred embodiment of the XTT-system the fixed angle $\psi$ is in a range $10° < \psi < 70°$, preferably $30° < \psi < 50°$. These ranges allow for a good compromise between the quality of the reconstructed scattering tensors and the corresponding amount of poses of the specimen in which projections are acquired.

In one or more embodiments, the stage or the MT-system is designed to rotate the specimen about a second axis of rotation. This allows to acquire projections for a larger number of different orientations of the specimen and therefore for a more precise and finer reconstruction. Compared to embodiments in which only one axis of rotation is used, these embodiments are more complex.

In the before mentioned embodiments, the second axis of rotation is preferably orthogonal to the first axis of rotation.

This allows covering large range of specimen orientations and allows for an efficient orienting of the specimen.

In the before mentioned embodiments, the second axis of rotation can be stationary with respect to the source and the detector and during a rotation about the second axis of rotation by an angle $\Delta\theta$ the first axis of rotation gets rotated by the same angle $\Delta\theta$ within a plane being orthogonal to the second axis of rotation.

In alternative embodiments the stage and the XTT-system is designed to rotate the specimen only about the first axis of rotation, wherein the first axis of rotation is tilted with respect to the direction being parallel to the grating planes and orthogonal to the grating lines by an angle $\alpha$, with $0°<\alpha<180°$, preferably with $20°<\alpha<70°$, more preferably with $35°<\alpha<55°$. These embodiments allow for a particular compact and robust XTT-system.

In the before mentioned embodiments the first axis of rotation is preferably stationary with respect to the source and the detector.

In one or more of the before mentioned embodiments, the first and second gratings are preferably arranged in parallel planes and/or the first and second gratings are line gratings.

The source can comprise an X-ray source and a third grating with grating lines parallel to the first and second grating lines. The third grating allows providing an X-ray beam with at least partially coherent X-rays from an X-ray beam being less coherent.

The present invention further relates to a method for reconstructing scattering tensors for a specimen by using an XTT-system according to one or more of the mentioned embodiments, wherein the sequence of two-dimensional intensity distributions is acquired for a scanning process comprising rotating the specimen about the first axis of rotation to at least 50, preferably to at least 80 different first rotational positions covering an angle range from 0° to 360°.

According to an embodiment the scanning process further comprises rotating the specimen about the second axis of rotation to at least 3, preferably to at least 8 different second rotational positions covering an angle range from 0° to 180°, wherein for each of said different second rotational positions the specimen is rotated about the first axis of rotation to at least 50, preferably to at least 80 different first rotational positions covering an angle range from 0° to 360°.

Preferably, the first and/or second rotational positions are evenly distributed over the respective angle range.

BRIEF DESCRIPTION OF THE DRAWINGS

Further details and advantages of the present invention will become apparent from the following description, in which preferred embodiments are described in detail with reference to the appended drawings, in which.

In the drawings same elements are designated with same reference numbers.

DETAILED DESCRIPTION OF PREFERRED EMBODIMENTS

Figure 2A:
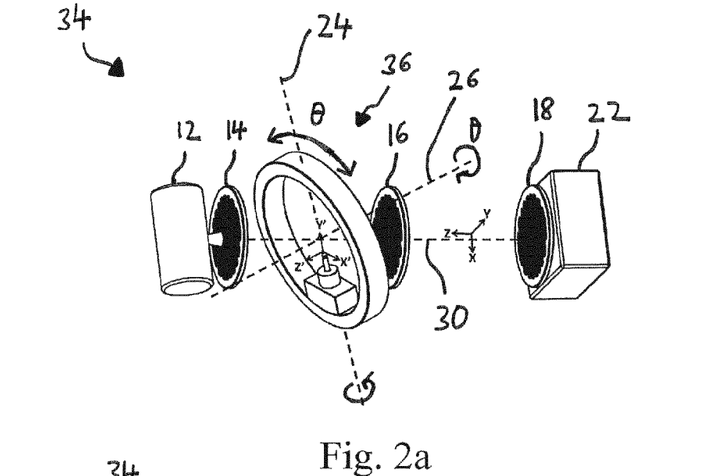
FIGS. 2a-c show different views of an XTT-system according to an embodiment of the present invention, FIG. 3a, b show different views of an XTT-system according to another embodiment of the present invention, FIG. 4, 5 show reconstructed scattering tensors for a carbon fiber reinforced polymer.
Figure 2B:
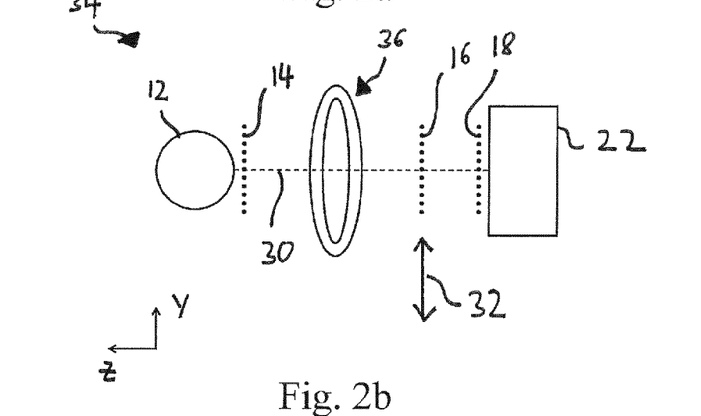
Figure 2C:
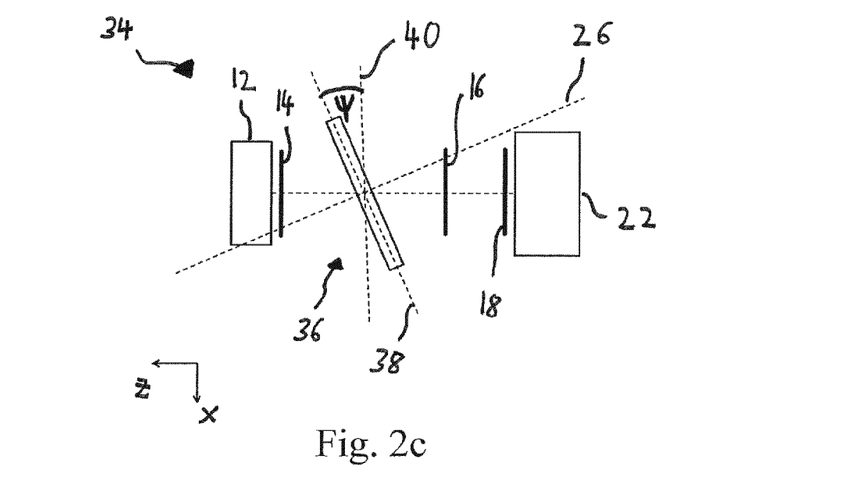

FIGS. 2a to 2c show an XTT-system 34 according to an embodiment of the present invention, wherein FIG. 2a shows a perspective view of the XTT-system 34, FIG. 2b shows a side view (in x-direction) of the XTT-system 34 and FIG. 2C shows a top view (in y-direction) of the XTT-system 34.

The XTT-system 34 comprises an X-ray source 12, a source grating 14, a first grating 16, a second grating 18, a specimen stage 36 and a detector 22.

Different from the specimen stage 20 of the XTT-system 10 of FIG. 1, specimen stage 36 of the XTT-system 34 does not correspond to a three-circle Eulerian Cradle and does not allow rotating the specimen about three different axes of rotation. In the example of FIG. 2 the specimen stage 36 comprises a two-circle cradle and only allows a rotation
  about a first axis of rotation 24 into different angle positions $\phi$ and
  about a second axis of rotation 26 into different angle positions $\theta$.

Unlike the three-circle Eulerian Cradle 20 FIG. 1, the plane 38 defined by the cradle ring of the specimen stage 36 is not movable into different angle positions $\psi$, but is fixed or stationary with respect to a stationary coordinate system x,y,z of the XTT-system 34, such that for all adjustable orientations of the specimen (not shown) the first axis of rotation 24 lies in the plane 38 which is tilted by a fixed angle $\psi$ with respect to a plane 40 which is parallel the to the planes of the first and second gratings 16 and 18, wherein $0°<\psi<90°$, as is shown in FIG. 2C.

In XTT-systems according to other embodiments of the present invention, which are not shown, $\psi$ can be equal to 90°. These embodiments can have a specimen stage with a cradle ring having holes in order not to block the beam or can have other specimen stages without a cradle ring with does not to block the beam for the configuration of $\psi=90°$.

In the XTT-system 34 the specimen is preferably positioned at a center of the cradle on the optical axis 30 of the XTT-system 34, wherein in the example of FIG. 2 the center is intersected by the first axis of rotation 24 and by the second axis of rotation 26.

In the XTT-system 34 of FIG. 2, the direction of the first axis of rotation 24 coincides with the y'-direction of a coordinate system x',y',z' of the specimen. The x',y',z' coordinate system of the specimen is rotated together with the specimen with respect to the stationary coordinate system x,y,z of the XTT-system 34. Both coordinate systems x',y',z' and x,y,z are Cartesian coordinate systems.

For the embodiment of FIG. 2, the second axis of rotation 26 is stationary with respect to the coordinate system x,y,z of the XTT-system 34 and the direction of the second axis of rotation 26 is orthogonal to the plane 40. During a rotation about the second axis of rotation 26 the first axis of rotation 24 is rotated in the plane 38 defined by the specimen stage 36.

In the XTT-system 34 of FIG. 2, the gratings 16, 18 are parallel and orthogonal to the optical axis 30 which corresponds or essentially corresponds to a beam path and which is a straight line in this embodiment. Each of the gratings 16, 18 has grating lines, wherein the grating lines of each of the gratings 16, 18 extend in the same direction orthogonally to the optical axis 30. The sensitivity direction 32 of the XTT-system 34, which corresponds to the direction in which a phase shift of the X-rays is measured, is parallel to the planes of the gratings 16, 18 and orthogonal to the grating lines and to the optical axis 30. In the MT-system 34, the sensitivity direction 32 coincides with the y-direction.

The source grating 14 is parallel to the gratings 16, 18 and has grating lines extending parallel to the grating lines of the gratings 16, 18. The source grating 14 is used provide at least partially coherent X-ray beams along the optical axis 30, for cases in which the X-rays provided by the source 12 along the optical axis 30 are not sufficiently coherent. Other embodiments may use sources being capable to provide sufficiently coherent X-rays along the optical axis 30, such that these embodiments may not comprise a source grating 14.

In case of θ=0, the direction of the first axis of rotation 24 (y'-direction) coincides with the y-direction.

Figure 3A:
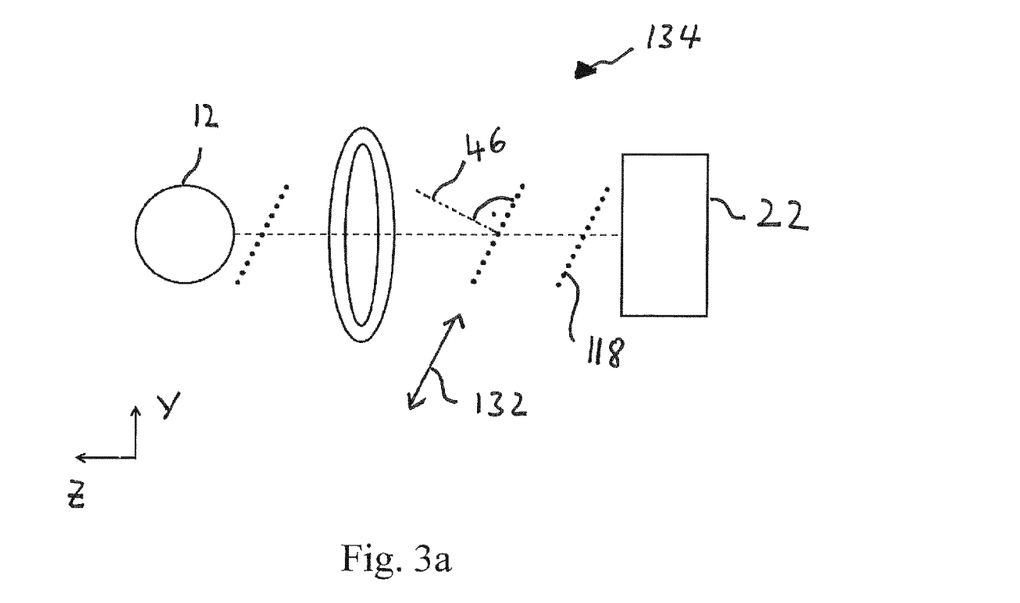
Figure 3B:
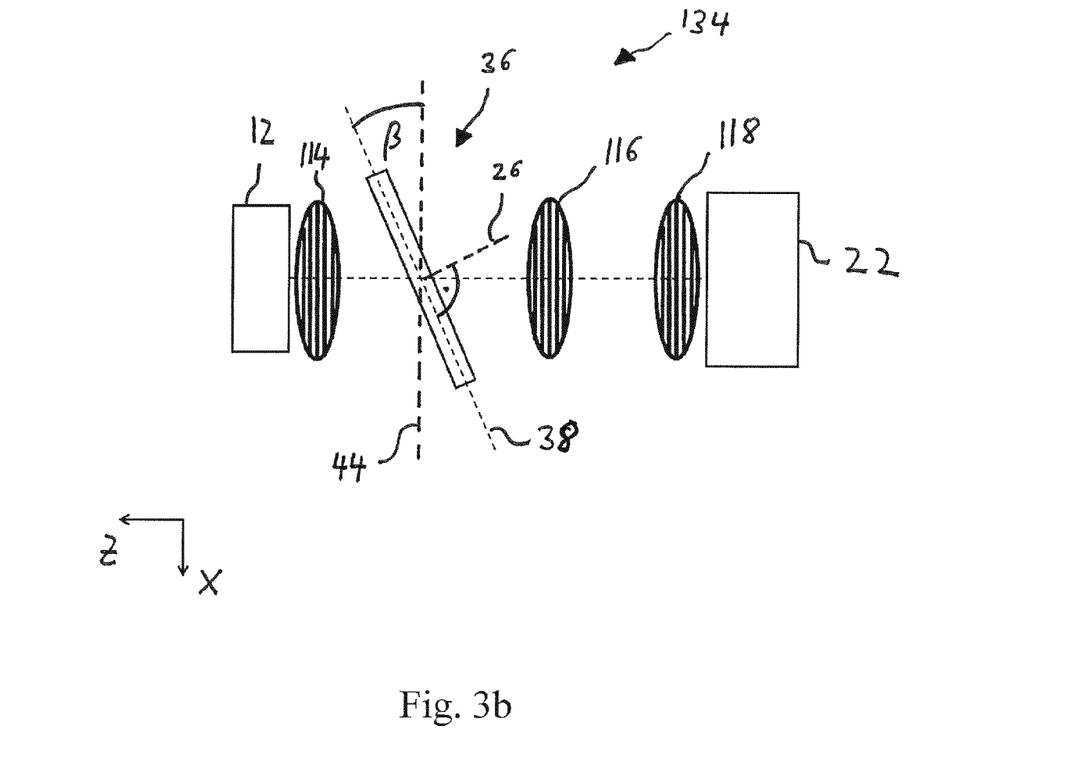

FIGS. 3a and 3b show an XTT-system 134 according to another embodiment of the present invention, wherein FIG. 3a shows a side view (in x-direction) of the XTT-system 134 and FIG. 3b shows a top view (in y-direction) of the XTT-system 134. The XTT-system 134 comprises a specimen stage 36 being similar to the specimen stage 36 of the XTT-system 34 of FIG. 2, being similarly arranged with respect to the source 12 similarly allowing rotating a specimen about a first axis of rotation 24 and a second axis of rotation 26. Similar to the XTT-system 34 of FIG. 2, the optical axis 30 coincides or essentially coincides with a beam path 42

The XTT-system 134 comprises a source grating 114, first and a second gratings 116, 118 being pairwise parallel to each other but—different from the gratings 14, 16, 18 of the XTT-system 34—being tilted with respect to a plane 44 being orthogonal to the direction of the optical axis 30. The grating lines of the source grating 114, the first and second gratings 116, 118 extent parallel to the plane 44. Therefore, different from the XTT-system 34, in the XTT-system 134 the sensitivity direction 132, which corresponds to the direction in which a phase shift of the X-rays is measured and which is parallel to the planes of the gratings 116, 118 and orthogonal to the grating lines, is not orthogonal to the direction of the optical axis 30 at a location of the stage 36, as shown in FIG. 3a.

In the XTT-systems 34, 134 the sensitivity direction 32, 132 respectively corresponds to a shifting direction, in which the first and the second gratings 16, 18 or 116, 118 are shifted with respect to each other when acquiring the 2D projections which are processed to get the dark-field signal.

In other embodiments, which are not shown, the shifting direction does not correspond the sensitivity direction but has a component in the sensitivity direction.

It is noted that both in the XTT-systems 34, 134—as well as in other preferred embodiments—for the measurements except for rotating the specimen by the stage and relatively shifting the gratings preferably no other movements are performed and no other corresponding degrees of freedom or parameter variations need to be introduced, such that the XTT-systems of the present invention can be quite robust and reliable.

In the XTT-system 134 the first axis of rotation 24 lies in a plane 38 for all orientations of the specimen during a measurement and can be rotated within this plane 38 by a rotation about the second axis of rotation 26, which extends in a direction being orthogonal to the plane 38, as shown in FIG. 3b. As further shown in FIG. 3b, the plane 38 is tilted by an angle β with respect to the plane 44 being orthogonal to the direction of the beam path 42 or optical axis 30, wherein 0°<β<90°.

Further, in the XTT-system 134, the plane 38 is tilted by an angle ψ with respect to the planes of the gratings 116, 118, wherein 0°<ψ<00°. The angle ψ corresponds to the angle between the direction being orthogonal to plane 38 (corresponding to the direction of axis 26 in FIG. 3b) and the direction 46 being orthogonal to the gratings 116, 118 (shown in FIG. 3a).

XTT-systems according to other embodiments of the present invention, which are not shown, comprise only one axis of rotation 24, which is preferably stationary with respect to the x,y,z coordinate system of the respective XTT-system.

Examples for these embodiments with only one stationary axis of rotation 24 correspond to the XTT-system 34 of FIG. 2 with the difference, that the first axis of rotation 24 is fixed at a specific angle of θ, wherein 0°<θ<180°, preferably 20°<θ<70°, more preferably 35°<θ<55°. For θ=0° and for θ=180°, the direction of the first axis of rotation 24 of the XTT-systems 34 would coincide with the y-direction and with the sensitivity direction 32 of the XTT-systems 34.

Other examples for these embodiments with only one axis of rotation 24 correspond to the XTT-system 134 of FIG. 3 with the difference, that the first axis of rotation 24 is fixed in a specific orientation, such that the angle α between the sensitivity direction 132 and the first axis of rotation 24 is in the range 0°<α<180°, preferably in the range 20°<α<70°, more preferably in the range 35°<α<55°, For α=0° and for α=180°, the direction of the first axis of rotation 24 of the XTT-system 134 would coincide with the sensitivity direction 132 of the XTT-systems 134 but would not coincide with the y-direction. For the XTT-system 134 of FIG. 3 the y-direction corresponds to the direction of the component of the sensitivity direction 132 which is orthogonal to the direction of the beam.

In these embodiments with only one axis of rotation 24 the single first axis of rotation 24 is tilted with respect to the sensitivity direction of the respective XTT-system by an angle larger than 0° and smaller than or equal to 90° and with respect to the direction of the X-ray beam at the location of the specimen by an angle larger than 0° and smaller than 90°.

The inventors have found that with the tilting of the first and second axis of rotation 24, 26 and with the tilting of the first axis of rotation 24 of the before mentioned XTT-systems according to the invention, it is possible to scan over a set of different orientations, which is large enough to allow for full 3D reconstruction of X-ray scattering tensors, by using only two axes of rotation and even by using one single axis of rotation.

Figure 4A:
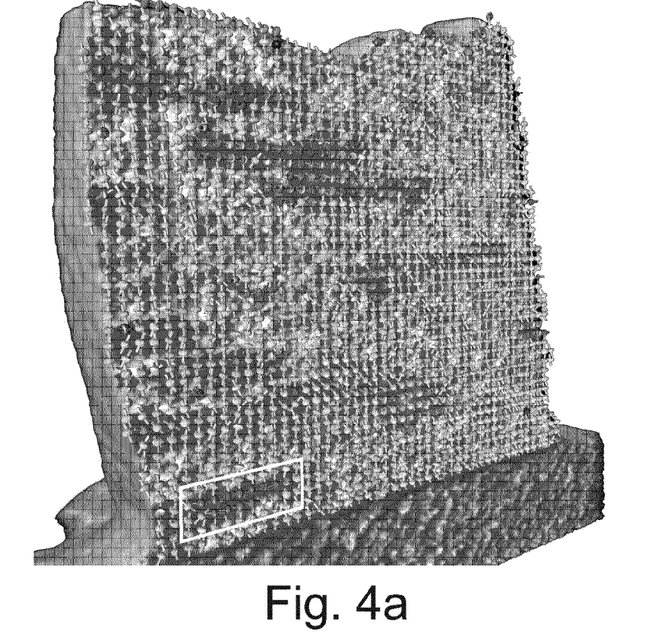

This surprising discovery is illustrated by FIGS. 4 and 5 which are explained in further detail in the following:

FIG. 4 a shows a plurality of reconstructed scattering tensors which have been reconstructed from a continuous measurement spanning about 30 hours performed by a prior art XTT-system to with three axes of rotation as shown in FIG. 1 with the following acquisition scheme B:

$B=\{(\psi,\theta,\phi);\psi\in[0°,20°,40°],$ $\theta\in[0°,11,25°,\ldots,90°],$ $\phi\in[0°,3,6°,\ldots,360°]\}.$ The acquisition scheme B comprises 2700 different poses for the specimen (=3 (for ψ)×9 (for θ)×100 (for φ)), with 8 grating steps in shifting direction per pose and with 5 s exposure time per grating step in each pose.

The scattering tensors which have been reconstructed for corresponding voxels of the specimen are presented by corresponding ellipsoids, wherein for each ellipsoid the distance from the center of the ellipsoid to a point on the surface of the ellipsoid indicates the relative scattering intensity or strength for the corresponding direction at the voxel location for which scattering tensor is reconstructed. Accordingly, the direction of the smallest half axis of an ellipsoid representing a scattering tensor corresponds to the direction with the lowest relative scattering strength at the corresponding location. This direction with the lowest relative scattering strength indicates an orientation of a microstructure within the specimen and is further indicated in FIGS. 4 and 5 for each scattering tensor by an additional bar or rod through the corresponding ellipsoid.

Figure 4B:
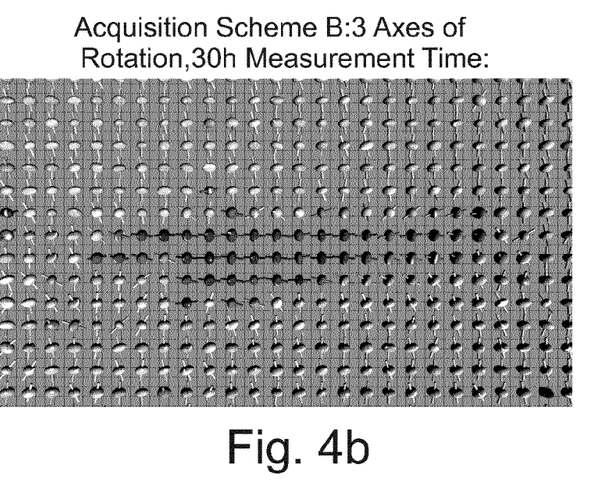

The specimen for which the scattering tensors of FIGS. 4 and 5 have been reconstructed corresponds to a carbon fiber reinforced polymer (CFRP) comprising vertically extending layers of laminates (indicated in FIGS. 4a and 4b by comparatively bright ellipsoids and vertical or essentially vertical bars) joined together with pieces of horizontally connecting fibers (indicated by comparatively dark ellipsoids and horizontal or essentially horizontal bars in FIGS. 4a and 4b).

FIG. 4b and FIGS. 5a to 5c show reconstructed scattering tensors for the same portion of the specimen indicated by the white rectangle in FIG. 4a, wherein the scattering tensors of FIGS. 4a and 4b correspond to the same above acquisition scheme B.

Figure 5A:
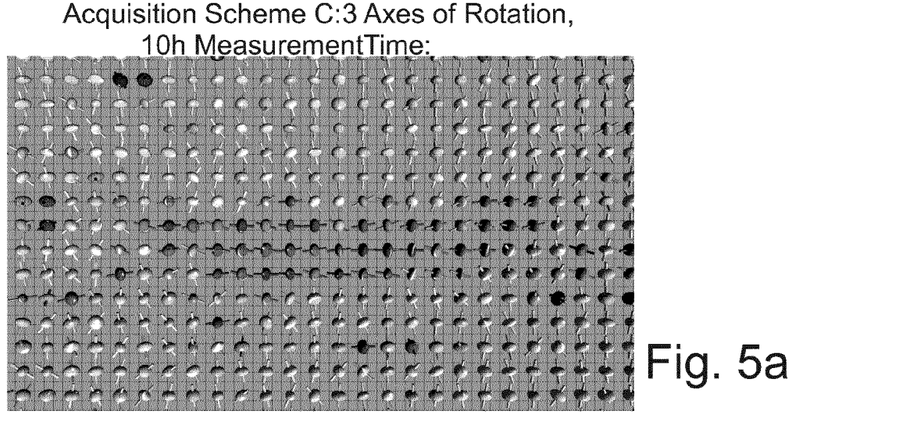
Figure 5B:
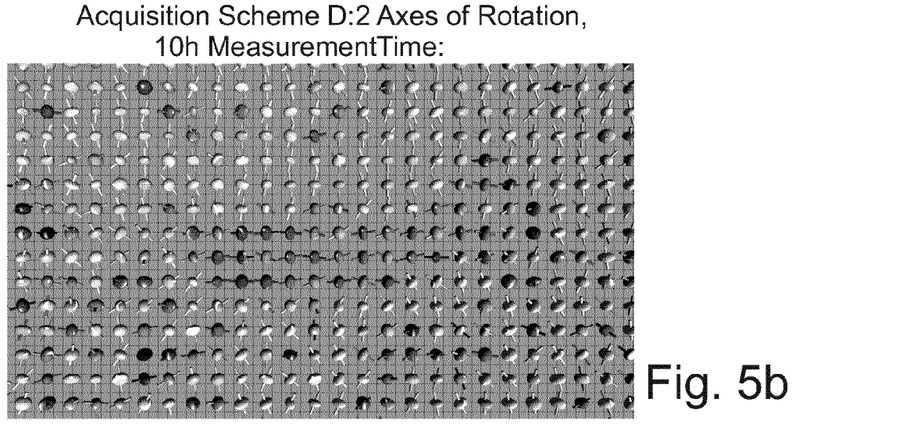
Figure 5C:
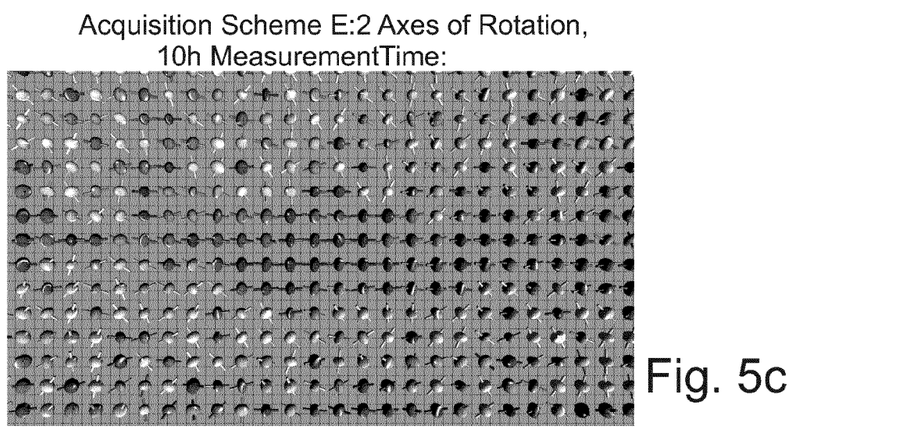

Compared to the scattering tensors of FIG. 4, the scattering tensors of FIG. 5 have been reconstructed with a lower measurement effort, wherein the scattering tensors of FIG. 5a have been reconstructed from a measurement using an acquisition scheme C, the scattering tensors of FIG. 5b have been reconstructed from a measurement using an acquisition scheme D and the scattering tensors of FIG. 5c have been reconstructed from a measurement using an acquisition scheme E.

Different from acquisition scheme B, which comprises 2700 different poses, uses of three different axes of rotation 24, 26, 28 and needs a measurement time of 30 hours, acquisition schemes C (FIG. 5a), D (FIG. 5b) and E (FIG. 5c) only comprise 900 different poses and need a measurement time of about 10 hours, wherein the acquisition schemes C (FIG. 5a) uses three different axes of rotation 24, 26, 28 and wherein the acquisition schemes D and E (FIGS. 5b and 5c) use only two different axes of rotation 24, 26.

Acquisition scheme C defines a scan over the following poses.

$$C=\{(\psi,\theta,\phi); \psi\in[0°,20°,40°],$$

$$\theta\in[0°,11,25°,\ldots,90°],$$

$$\phi\in[0°,10,91°,\ldots,360°]\}.$$

Acquisition scheme D defines a scan over the following poses.

$$D=\{(\psi,\theta,\phi); \psi=0°,$$

$$\theta\in[0°,11,25°,\ldots,90°],$$

$$\phi\in[0°,3,6°,\ldots,360°]\}.$$

Acquisition scheme E defines a scan over the following poses.

$$E=\{(\psi,\theta,\phi); \psi=0°,$$

$$\theta\in[0°,11,25°,\ldots,90°],$$

$$\phi\in[0°,3,6°,\ldots,360°]\}.$$

The reconstruction of FIG. 4b has been performed with the highest measurement effort and corresponds to a reference reconstruction, which correctly determines the location and the horizontal orientation of the carbon fibers (dark ellipsoids with horizontal bars) and the location and the vertical orientation of the surrounding polymer layers (bright ellipsoids with vertical bars).

The reconstructions of FIGS. 5a to 5e are comparable in terms of measurement time which corresponds to 10 hours and in terms of the number of different poses for the specimen measurement corresponding to 900 different poses.

The inner structure of the specimen can still be determined from the reconstructions shown in FIG. 5a (three axes of rotation) and 5b (two axes of rotation, $\psi$=40°). As can be seen in FIGS. 5a and 5b the reconstructed scattering tensors correctly indicate the orientation of the fibers and of the laminates and to allow distinguishing them.

In FIG. 5c, however, a distinction between the horizontal fibers and vertical laminates cannot be made sufficiently clear anymore or at least with significantly reduced accuracy, such that scheme E which uses $\psi$=0° does not appear suitable for a correct full 3D reconstruction of scattering tensors.

The inventors have found that it is possible to achieve a full 3D scattering tensor reconstruction with sufficient quality not only with two axes of rotation but also with one single axis of rotation, if the angles are chosen to be in the before mentioned ranges.

Figure 7A:
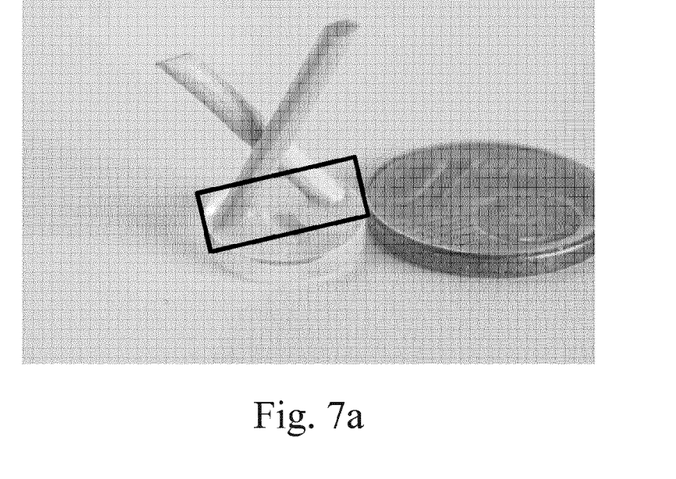
FIG. 7a-d show a specimen being made of toothpicks and reconstructed scattering tensors for a portion thereof resulting from different acquisition schemes.
Figure 7B:
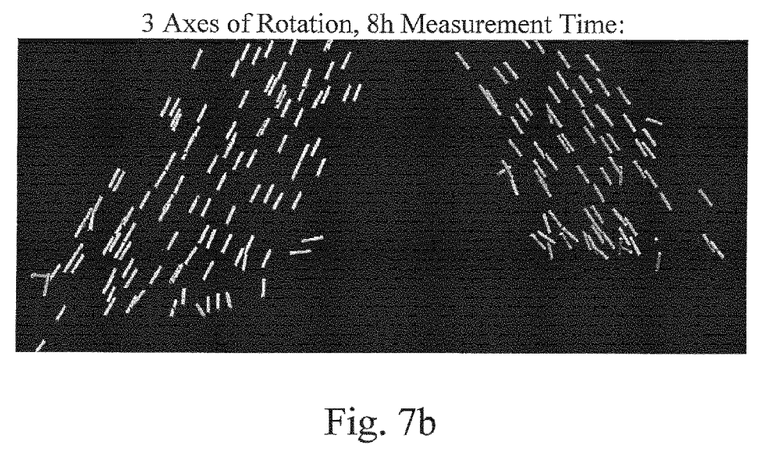
Figure 7C:
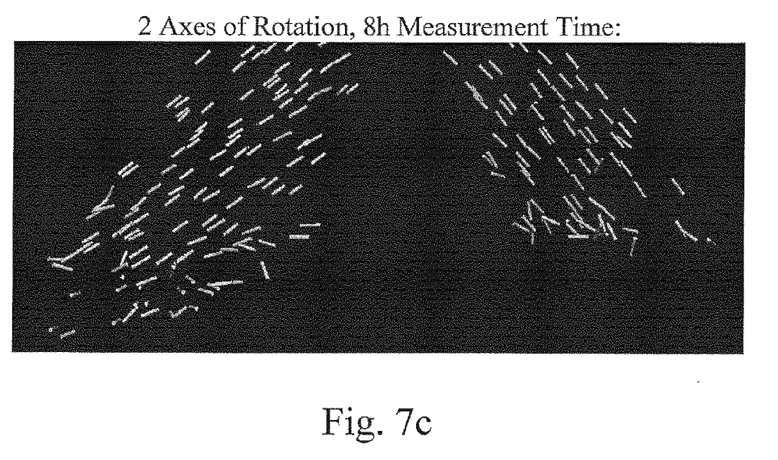
Figure 7D:
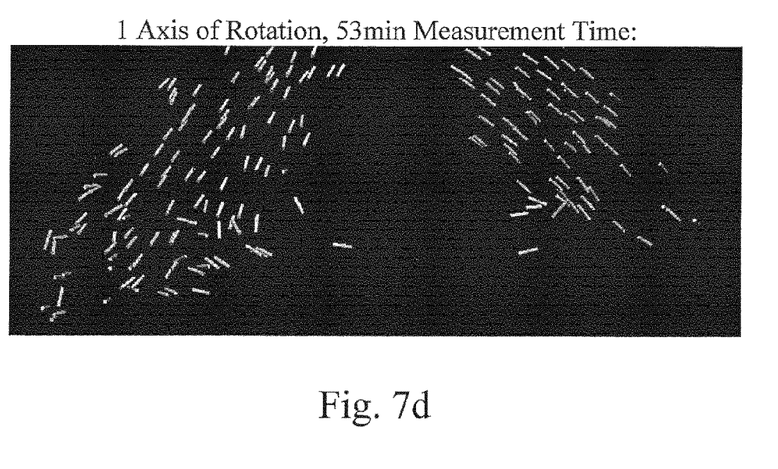

This is demonstrated by FIGS. 7a to 7d showing a specimen being made of crossing toothpicks (FIG. 7a) as well as reconstructed scattering tensors (FIGS. 7b to 7d) for the specimen portion indicated by the square in FIG. 7a. The scattering tensors of FIG. 7b have been reconstructed using an acquisition scheme with 3 axes of rotation and a measurement time of 8 h, the scattering tensors of FIG. 7c have been reconstructed using an acquisition scheme with 2 axes of rotation and a measurement time of 8 h and the scattering tensors of FIG. 7d have been reconstructed using an acquisition scheme with only one axes of rotation and a measurement time of only 53 minutes. The smallest half axes of the scattering tensors are illustrated as sticks, respectively. As can be seen in FIG. 7d, it is still possible to determine the orientation of the wood fibers within the toothpicks correctly with a significantly lower complexity of the system (only one axis of rotation) and with significantly lower measurement time. The acquisition scheme of FIG. 7d is given by:

$$F=\{(\psi,\theta,\phi); \psi=40°,$$

$$\theta=56,25°,$$

$$\phi\in[0°,3,78°,\ldots,288°]\}.$$

The use of only one and only two axes of rotation allows significantly reducing the complexity of XTT-systems and to make XTT-system even more robust and compact. For example, in FIG. 2a the $\psi$-position is fixed and the cradle 36 is not rotated about a corresponding third axis of rotation 28, such that the gratings 14 and 15 can be arranged significantly closer together thereby making the whole XTT-system 34 significantly more compact. Further, less axes of rotation reduce the risk of misalignment and reduce the complexity of the system, which increases the robustness.

Tensor Reconstruction:

In order to reconstruct a set of scattering tensors a so called forward model can be used, according to which the dark-field projection d(x) measured at the detector 22 for an acquisition pose x=(ψ, θ, φ) is given by:

$$d(x) = \exp\left(-\int_{i(x)} \sum_k [\zeta_k(r)^2 \cdot w(\epsilon_k, x)] dr\right), \quad (1)$$

wherein $\zeta_k(r_i)$ denotes the scattering strengths at every voxel $r_i$, i=1, ..., I, for a number of sampling directions $\in_k$, k=1, ..., K, and wherein $w(\in_k, x)$ are the weight factors that determine how well the scattering direction $\in_k$ is measured at the acquisition pose x.

The weight factor $w(\in_k, x)$ is given by $$w(\in_k, x) = (|\in_k \times \hat{t}(x)| \langle \in_k, \hat{s}(x) \rangle)^2, \quad (2)$$

wherein $\hat{t}(x)$ is the unit vector in the direction of the optical axis 30 or the direction of the beam path 42 at the location of the specimen, respectively, and wherein $\hat{s}(x)$ is the unit vector in the sensitivity direction 32, 132 at the acquisition pose x. The sampling directions $\in_k$ are stationary with respect to the x',y',z' coordinate system of the specimen and do not change within the x',y',z' coordinate when the pose x of the specimen is changed, while the directions $\hat{t}(x)$ and $\hat{s}(x)$ change within the x',y',z' coordinate when the pose x of the specimen is changed.

By using the above equations, the scattering strengths $\zeta_k(r_i)$ can be reconstructed at every voxel $r_i$, i=1, ..., I, for each sampling direction $\in_k$, k=1, ..., K. Then, an ellipsoid fit can be performed on these K sampling directions $\in_k$ to recover the scattering tensor at every voxel $r_i$.

From the above equation for the weight factor $w(\in_k, x)$ it can be seen that the dark-field projection d(x) measured at a certain acquisition pose x depends on the relative orientation of the specimen sampled by sampling directions $\in_k$ with respect to the direction $\hat{t}(x)$ of the optical axis 30 and with respect to the sensitivity direction $\hat{s}(x)$.

The inventors have found that in the proposed arrangements the specimen can be scanned through a set of acquisition poses x which still allow for a correct full 3D reconstruction of the scattering tensors, although only two or even only a single axis of rotation is used. This allows for XTT-systems which are more compact and robust and less complex.

Theoretical Model for Predicting the Efficiency of an Acquisition Scheme

In the following a theoretical model is presented which has been developed by the inventors for predicting the efficiency of an acquisition scheme:

Let Σ and T be two sets of uniformly distributed points on a unit sphere:

$$\Sigma = \{\sigma_k \in \mathbb{S}^2, k=1,2,\ldots,N\},$$

$$\mathcal{T} = \{\tau_j \in \mathbb{S}^2, j=1,2,\ldots,N\},$$

wherein $\mathbb{S}^2$ is the unit sphere and N=10000. The mean vector $m_\Sigma$ of Σ is given by:

$$m_\Sigma = \frac{1}{N} \sum_{k=1}^{N} \sigma_k.$$

Let X be an acquisition scheme using n different acquisition poses $x_i$:

$$X := \{x_i := (\psi_i, \theta_i, \phi_i); i=1, \ldots, n\}.$$

The objective is to define a quantity of coverage(X,k) that represents how well the orientation $\sigma_k \in \Sigma$ is measured by the acquisition scheme X. The proposed procedure for computing the Coverage(X,k) is outlined in the following:

1. Define $X_k \subset X$ as the set of poses that measure the orientation $\sigma_k \in \Sigma$:

$$X_k := \{x \in X; w(\sigma_k, x) > T_c\}.$$

wherein $w(\sigma_k, x)$ is the before mentioned weight factor that specifies how well the orientation $\sigma_k$ is measured by the acquisition pose x, and $T_c = 0{,}9$ is an arbitrarily chosen threshold. $w(\sigma_k, x)$ is given by an equation corresponding to the above equation (2):

$$w(\sigma_k, x) = (|\sigma_k \times \hat{t}(x)| \langle \sigma_k, \hat{s}(x) \rangle)^2 \quad (3)$$

wherein $|\bullet \times \bullet|$ denotes the magnitude of the cross product and $\langle \bullet, \bullet \rangle$ denotes the standard scalar product.

2. $R_k$ is the mean resulting length of the vectors $\hat{t}(x)$ for all $x \in X_k$, $$R_k = \left\| \frac{1}{|X_k|} \sum_{x \in X_k} \hat{t}(x) \right\|.$$

wherein $\|\bullet\|$ denotes the Euclidean length of a vector.

3. $T_k \subset T$ is the set of points that are measured by $X_k$, assuming that each vector $\hat{t}(x)$ contributes to the measurement of points lying within a cone of opening angle 5° around it:

$$\mathcal{T}_k := \{\tau \in \mathcal{T} : \langle \tau, \hat{t}(x) \rangle > \cos(2.5°) \forall x \in X_k\}.$$

4. The Coverage(X,k) is then defined as:

$$\text{Coverage}(X, k) := 2 \cdot (1 - R_k) \cdot \frac{|\mathcal{T}_k|}{N}.$$

The quantity $2 \cdot (1-R_k)$ is the spherical variance, while $|T_k|/N$ is related to the cumulative solid angle spanned by the $\hat{t}(x)$, $x \in X_k$. Thus, a higher value of Coverage (X,k) is achieved when the $\hat{t}(x)$ are distributed widely over the unit sphere.

Next, the unit vectors $\sigma_k \in \Sigma$ are scaled with the values of Coverage(X,k) for all values of k resulting in:

$$\Gamma(X) := \{\gamma_k := \sigma_k \cdot \text{Coverage}(X,k), k=1, \ldots, N\},$$

and its mean:

$$m_{\Gamma(X)} = \frac{1}{N} \sum_{k=1}^{N} \gamma_k.$$

The angular deviation of the normalized mean vector $\hat{m}_{\Gamma(X)}$ from the normalized mean vector $\hat{m}_\Sigma$ is a measure of the non-uniformity of the Coverage Sphere. Finally, the proposed Coverage Metric CM(X) is introduced as:

$$CM(X) := \langle \hat{m}_{\Gamma(X)}, \hat{m}_\Sigma \rangle \cdot \frac{1}{N} \sum_{k=1}^{N} \text{Coverage}(X, k).$$

CM(X)∈[−1,1] can be used as a measure of the efficiency of the acquisition scheme X. Positive and higher values of CM imply a more comprehensive and uniform measurement of all orientations on the unit sphere. Negative values, in particular, indicate severe inhomogeneities on the Coverage Sphere.

Figure 6:
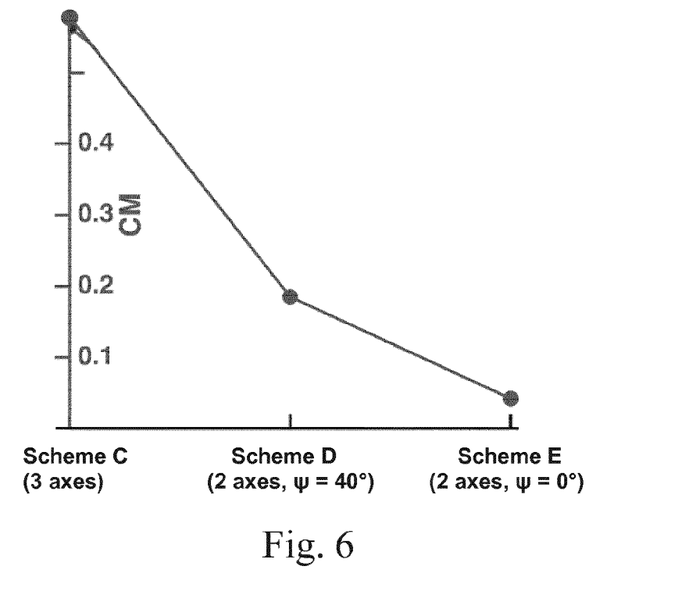
FIG. 6 shows a predicted performance of different acquisition schemes.

In FIG. 6 a values of the Coverage Metric CM(C), CM(D) and CM(E) are shown for the above acquisition schemes C, D and E supporting the experimental result shown in FIGS. 5a to 5c, i.e. that the reconstruction quality of scheme E is the worst and the reconstruction quality of scheme C the best out of schemes C, D and E and that schemes D (2 axes of rotation, $\psi=40°$) allows for a better reconstruction than scheme E (2 axes of rotation, $\psi=0°$).

Accordingly, the proposed concept of the Coverage Metric allows theoretically comparing the quality of different acquisition schemes with each other and to predict which scheme provides the best quality. By an additional comparison with actual experimental results (as shown in FIGS. 4 and 5) it was possible to identify acquisition schemes with only one and only two axes of rotation which are still suitable for full 3D scattering tensor reconstruction with sufficient quality, such as scheme D, as shown in FIG. 5b.

While specific embodiments have been described in detail, it is not intended that the scope of protection is limited by the specific embodiments. The scope of protection is defined by the appended claims.

LIST OF REFERENCE SIGNS

10 XTT-system
12 X-ray source
14,114 source grating
16, 116 first grating
18, 118 second grating
20 specimen stage
22 detector
24 first axis of rotation
26 second axis of rotation
28 third axis of rotation
30 optical axis
32, 132 sensitivity direction
34, 134 XTT-system
36 specimen stage
38 plane
40 plane of the first and second gratings
42 beam path at a location of the stage
44 plane orthogonal to the optical axis 30 at a location of the stage 36
46 direction being orthogonal to the gratings 116,118

The invention claimed is:

1. An X-ray tensor tomography (XTT) system, comprising
a source configured for providing a beam with coherent X-rays along a beam path;
an interferometer arranged along the beam path downstream the source and comprising a first grating with first grating lines and a second grating with second grating lines, wherein:
the second grating lines are parallel to the first grating lines,
the XTT-system is configured to relatively shift the first grating and the second grating with respect to each other in a shifting direction into different grating positions, wherein the shifting direction is parallel to the planes of the gratings;
a stage configured for mounting a specimen in the beam path downstream the source, wherein the stage is designed adapted to rotate the specimen about at least one first axis of rotation and about not more than two axes of rotation for orienting the specimen in the beam path and with respect to the beam path, wherein the first axis of rotation lies in a plane which is tilted:
by an angle $\psi$ with respect to the to the planes of the gratings wherein $0°<\psi<90°$, and
by an angle $\beta$ with respect to a plane being orthogonal to the direction of the beam path at a location of the stage, wherein $0°<\beta<90°$,
a detector arranged downstream the source and the interferometer and configured for acquiring a sequence of two-dimensional intensity distributions of X-rays of the beam,
a reconstruction unit configured to reconstruct scattering tensors for a specimen containing on or more structures capable of scattering X-rays, wherein the scattering tensors provide information about the three-dimensional position of the one or more structures and about an orientation of the one or more structures, based on:
a sequence of two-dimensional intensity distributions acquired for different orientations of the specimen and for different grating positions, and on
the orientations and grating positions, for which the sequence of two-dimensional intensity distributions is acquired.

2. The XTT-system of claim 1, wherein the source is configured for providing the beam along an optical axis of the XTT-system, and wherein the second grating lines and the first grating lines are orthogonal to the optical axis, and/or wherein the shifting direction is orthogonal to the grating lines.

3. The XTT-system of claim 1, wherein the angle $\psi$ is $10°<\psi<70°$.

4. The XTT-system of claim 1, wherein the stage is adapted to rotate the specimen about a second axis of rotation.

5. The XTT-system of claim 4, wherein the second axis of rotation is orthogonal to the first axis of rotation.

6. The XTT-system of claim 4, wherein the second axis of rotation is stationary with respect to the source and the detector and wherein during a rotation about the second axis of rotation by an angle $\Delta\theta$ the first axis of rotation is rotated by the same angle $\Delta\theta$ within a plane being orthogonal to the second axis of rotation.

7. The XTT-system of claim 1, wherein one of the stage and the XTT-system is adapted to rotate the specimen about only the first axis of rotation, and wherein the first axis of rotation is tilted with respect to the direction being parallel to the grating planes and orthogonal to the grating lines by an angle $\alpha$, with $0°<\alpha<180°$.

8. The XTT-system of claim 7, wherein the first axis of rotation is stationary with respect to the source and the detector.

9. The XTT-system of claim 7, wherein $20°<\alpha<70°$.

10. The XTT-system of claim 7, wherein $35°<\alpha<55°$.

11. The XTT-system of claim 1, wherein the first and second gratings are arranged in parallel planes.

12. The XTT-system of claim 1, wherein the source comprises an X-ray source and a third grating with grating lines parallel to the first and second grating lines.

13. A method for reconstructing scattering tensors for a specimen by using the XTT-system of claim 1, wherein the sequence of two-dimensional intensity distributions is acquired for a scanning process comprising rotating the specimen about the first axis of rotation to at least 50, preferably to at least 80 different first rotational positions covering an angle range from 0° to 360°.

14. A method for reconstructing scattering tensors for a specimen by using the XTT-system of claim 1, wherein the scanning process further comprises:
rotating the specimen about the second axis of rotation to at least 3 different second rotational positions covering an angle range from 0° to 180°, wherein for each of said different second rotational positions the specimen is rotated about the first axis of rotation to at least 50 different first rotational positions covering an angle range from 0° to 360°.

15. A method for reconstructing scattering tensors for a specimen by using the XTT-system of claim 1, wherein one or both of the first and/or second rotational positions are evenly distributed over the respective angle range.

16. The XTT-system of claim 1, wherein $30°<\psi<50°$.

17. The XTT-system of claim 1, wherein the first and second gratings are line gratings.

18. An X-ray tensor tomography (XTT) system, comprising
a source for providing a beam with coherent X-rays along a beam path;
an interferometer arranged along the beam path downstream the source comprising a first grating with first grating lines and a second grating with second grating lines, wherein:
the second grating lines are parallel to the first grating lines,
the XTT-system is configured to relatively shift the first grating and the second grating with respect to each other in a shifting direction into different grating positions, wherein the shifting direction is parallel to the planes of the gratings;
a stage for mounting a specimen in the beam path downstream the source, wherein the stage is designed to rotate the specimen about at least one first axis of rotation and about not more than two axes of rotation for orienting the specimen in the beam path and with respect to the beam path, wherein the first axis of rotation lies in a plane which is tilted:
by an angle $\psi$ with respect to the to the planes of the gratings, wherein $0°<\psi<90°$, and
by an angle $\beta$ with respect to a plane being orthogonal to the direction of the beam path at a location of the stage, wherein $0°<\beta<90°$;
a detector arranged downstream the source and the interferometer for acquiring a sequence of two-dimensional intensity distributions of X-rays of the beam;
a reconstruction unit configured to reconstruct scattering tensors for a specimen containing on or more structures capable of scattering X-rays, wherein the scattering tensors provide information about the three-dimensional position of the one or more structures and about an orientation of the one or more structures, based on:
a sequence of two-dimensional intensity distributions acquired for different orientations of the specimen and for different grating positions, and on
the orientations and grating positions, for which the sequence of two-dimensional intensity distributions is acquired;
wherein the stage is designed to rotate the specimen about a second axis of rotation;
wherein the second axis of rotation is orthogonal to the first axis of rotation;
wherein the second axis of rotation is stationary with respect to the source and the detector; and
wherein during a rotation about the second axis of rotation by an angle $\Delta\theta$ the first axis of rotation is rotated by the same angle $\Delta\theta$ within a plane being orthogonal to the second axis of rotation.

* * * * *

UNITED STATES PATENT AND TRADEMARK OFFICE
CERTIFICATE OF CORRECTION

PATENT NO. : 10,697,902 B2
APPLICATION NO. : 16/309244
DATED : June 30, 2020
INVENTOR(S) : Sharma et al.

Page 1 of 1

It is certified that error appears in the above-identified patent and that said Letters Patent is hereby corrected as shown below:

In the Claims

In Column 14, Line 3:
Delete "designed"

In Column 14, Line 18:
Replace "on" with --one--

In Column 16, Line 7:
Replace "<" with --≤--

In Column 16, Line 10:
Replace "<" with --≤--

In Column 16, Line 15:
Replace "on" with --one--

Signed and Sealed this
Fifth Day of January, 2021

Andrei Iancu
*Director of the United States Patent and Trademark Office*